United States Patent
Bulusu et al.

(10) Patent No.: US 12,210,784 B2
(45) Date of Patent: Jan. 28, 2025

(54) CACHE TO RECEIVE FIRMWARE GENERATED DATA DURING FIRMWARE UPDATE

(71) Applicant: Microsoft Technology Licensing, LLC, Redmond, WA (US)

(72) Inventors: Mallik Bulusu, Bellevue, WA (US); Tom Long Nguyen, Redmond, WA (US); Daini Xie, Redmond, WA (US); Karunakara Kotary, Vancouver, WA (US); Muhammad Ashfaq Ahmed, Redmond, WA (US); Subhankar Panda, Redmond, WA (US); Ravi Mysore Shantamurthy, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 18/089,385

(22) Filed: Dec. 27, 2022

(65) Prior Publication Data
US 2024/0211257 A1 Jun. 27, 2024

(51) Int. Cl.
*G06F 21/57* (2013.01)
*G06F 3/12* (2006.01)
(Continued)

(52) U.S. Cl.
CPC ............ *G06F 3/123* (2013.01); *G06F 8/65* (2013.01); *G06F 9/30047* (2013.01); *G06F 9/52* (2013.01);
(Continued)

(58) Field of Classification Search
CPC .......... G06F 9/30047; G06F 8/65; G06F 9/52; G06F 11/0793; G06F 12/1491;
(Continued)

(56) References Cited

U.S. PATENT DOCUMENTS

| 11,188,407 B1 | 11/2021 | Swanson et al. |
| 2009/0156200 A1 | 6/2009 | Ishii |

(Continued)

FOREIGN PATENT DOCUMENTS

| CN | 110231950 A | 9/2019 |

OTHER PUBLICATIONS

KR 102263089, (translation), Jun. 10, 2021, 13 pgs <KR_102263089.pdf>.*

(Continued)

*Primary Examiner* — Tuan A Vu
(74) *Attorney, Agent, or Firm* — Schwegman Lundberg & Woessner, P.A.

(57) ABSTRACT

A computer implemented method includes creating a cache within system management memory to cache data from a firmware flash memory to allow access to the cache by system firmware, providing a baseboard management controller ownership of the firmware flash memory in a server, updating the firmware in the firmware flash memory via the baseboard management controller, relinquishing baseboard management controller ownership of firmware flash memory upon completion of updating the firmware, and flushing the cache back to the firmware flash memory in response to baseboard management controller relinquishing ownership of the firmware flash memory.

20 Claims, 6 Drawing Sheets

(51) Int. Cl.
*G06F 8/65* (2018.01)
*G06F 9/30* (2018.01)
*G06F 9/52* (2006.01)
*G06F 11/07* (2006.01)
*G06F 1/3237* (2019.01)
*G06F 12/02* (2006.01)
*G06F 12/0844* (2016.01)
*G06F 12/14* (2006.01)
*H04L 9/32* (2006.01)

(52) U.S. Cl.
CPC .......... *G06F 11/0793* (2013.01); *G06F 21/57* (2013.01); *G06F 21/572* (2013.01); *G06F 1/3237* (2013.01); *G06F 12/0246* (2013.01); *G06F 12/0844* (2013.01); *G06F 12/1491* (2013.01); *H04L 9/3265* (2013.01)

(58) Field of Classification Search
CPC ............. G06F 12/0844; G06F 12/0246; G06F 1/3237; G06F 3/123; G06F 21/57; G06F 21/572; G06F 8/654; H04L 9/3265
See application file for complete search history.

(56) References Cited

U.S. PATENT DOCUMENTS

| | | | |
|---|---|---|---|
| 2014/0108736 A1* | 4/2014 | Kuskin | G06F 12/1491 711/135 |
| 2015/0012690 A1* | 1/2015 | Bruce | G06F 12/0844 711/103 |
| 2015/0067368 A1* | 3/2015 | Henry | G06F 1/3237 713/600 |
| 2019/0332527 A1* | 10/2019 | Ponnuru | G06F 12/0246 |
| 2022/0286302 A1* | 9/2022 | Singh | H04L 9/3265 |

OTHER PUBLICATIONS

Anonymous: "Lock (computer science)—Wikipedia," Feb. 11, 2010 (Feb. 11, 2010), Retrieved from the Internet: URL: https://en.wikipedia.org/w/index.php?title=Lock_(computer_science)&oldid=343433349, retrieved on Sep. 6, 2018, 9 pages.

International Search Report and Written Opinion received for PCT Application No. PCT/US23/036976, Feb. 2, 2024, 15 pages.

* cited by examiner

CACHE TO RECEIVE FIRMWARE GENERATED DATA DURING FIRMWARE UPDATE

BACKGROUND

Firmware is a type of software that is used to interface hardware to higher level software functions such as operating system software. Different types of hardware may utilize firmware to allow higher-level software functions to execute on different hardware without modification of the higher-level software functions.

Firmware can be updated to fix firmware errors, enhance the firmware, or to repair hardware by bypassing portions of hardware that may have failed or otherwise have been found to be faulty or exhibit anomalous behavior. Updating the firmware in this manner can delay or avoid having to replace faulty hardware.

During updating of firmware, the update process maintains exclusive control of non-volatile random-access memory (NVRAM) to ensure proper updating and installation of the firmware. Such exclusive control makes it problematic in tracking other asynchronous events, such as hardware failures or anomalies that may trigger process flows that attempt to save critical error context for future reference during deferred repair activity. Access to the NVRAM to save the error context is not possible if the firmware update process maintains exclusive access control of the NVRAM.

SUMMARY

A computer implemented method includes creating a cache within system management memory to cache data from a firmware flash memory to allow access to the cache by system firmware, providing a baseboard management controller ownership of the firmware flash memory in a server, updating the firmware in the firmware flash memory via the baseboard management controller, relinquishing baseboard management controller ownership of firmware flash memory upon completion of updating the firmware, and flushing the cache back to the firmware flash memory in response to baseboard management controller relinquishing ownership of the firmware flash memory.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A key responsibility in operating large cloud implementations includes operating and maintaining system hardware infrastructure. The use of firmware as a tool to perform maintenance can help avoid costly hardware recall, which can adversely affect cloud service. The use of remote access service (RAS) capabilities allows an operator to update firmware used to interface hardware to higher level software functions such as operating system software. During such updates, NVRAM is exclusively owned by a baseboard management controller (BMC).

Previously, there was no way to guarantee the NVRAM reads/writes by firmware during firmware updates, as an update agent had exclusive access to NVRAM.

An improved method of updating firmware creates a cache within system management random access memory (SMRAM) that caches NVRAM contents into aperture in SMRAM. During a window of time while BMC exclusively owns the NVRAM, system firmware is still able to access system RAM to write error context data into the SMRAM. Following BMC relinquishing ownership of NVRAM, the contents of the SMRAM may be flushed back to the NVRAM. During subsequent boots, BIOS may query and restore the NVRAM contents such that the error context data may be used to address problems.

In one example, in case of power outages or other unplanned system resets, BIOS may use non-volatile dual in-line memory modules (DIMM) semantics to serialize the contents of NVRAM to other persistent data stores in the system.

Figure 1:
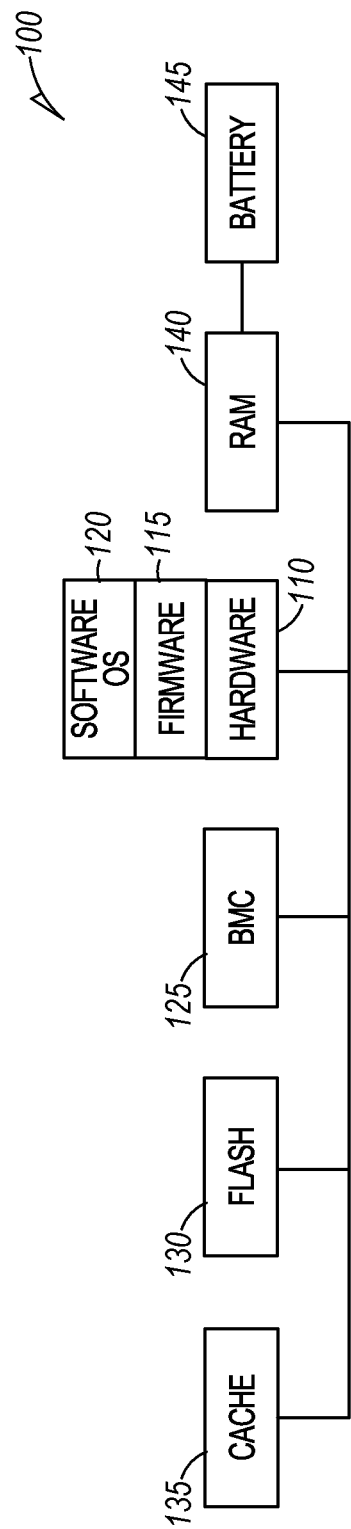
FIG. 1 is a simplified block architecture diagram of an improved firmware update system according to an example embodiment.

FIG. 1 is a simplified block architecture diagram of an improved firmware update system 100. System 100 includes hardware 110, such as one or more processors and sensors. Firmware 115 interfaces the hardware 110 to an operating system and software 120. In some examples, operating system and software 120 may include a hypervisor to provide virtual machines in a cloud computing environment.

A baseboard management controller (BMC) 125 is used to update the firmware 115 by updating a copy of the firmware in flash memory 130. Flash memory 130 in one example is non-volatile memory such as non-volatile random access memory (NVRAM). During such updating. BMC 125 obtains exclusive control of the flash memory 130 to ensure proper updating of the copy of the firmware. Prior to updating the firmware, a cache 135 may be created and is used to store error messages and other information that may be generated from hardware 110, including sensor reading from multiple sensors included in hardware 110. The operating system can also call and write to the firmware NVRAM flash memory 130.

In one example, the cache 135 may be appended to a further storage device, such as a RAM 140 via an aperture to save the contents of the cache. The RAM 140 may be coupled to a battery 145 to ensure non-volatility of the RAM 140. RAM 140 may comprise multiple non-volatile dual inline memory modules (NVDIMM) in one example. Flash 130 may be used to restore the flash memory 130 in the event of a power failure or other event affecting the contents of flash memory 130. System 100 may include a serial peripheral interconnect bus (SPI) 150 for transferring data between components.

Figure 2:
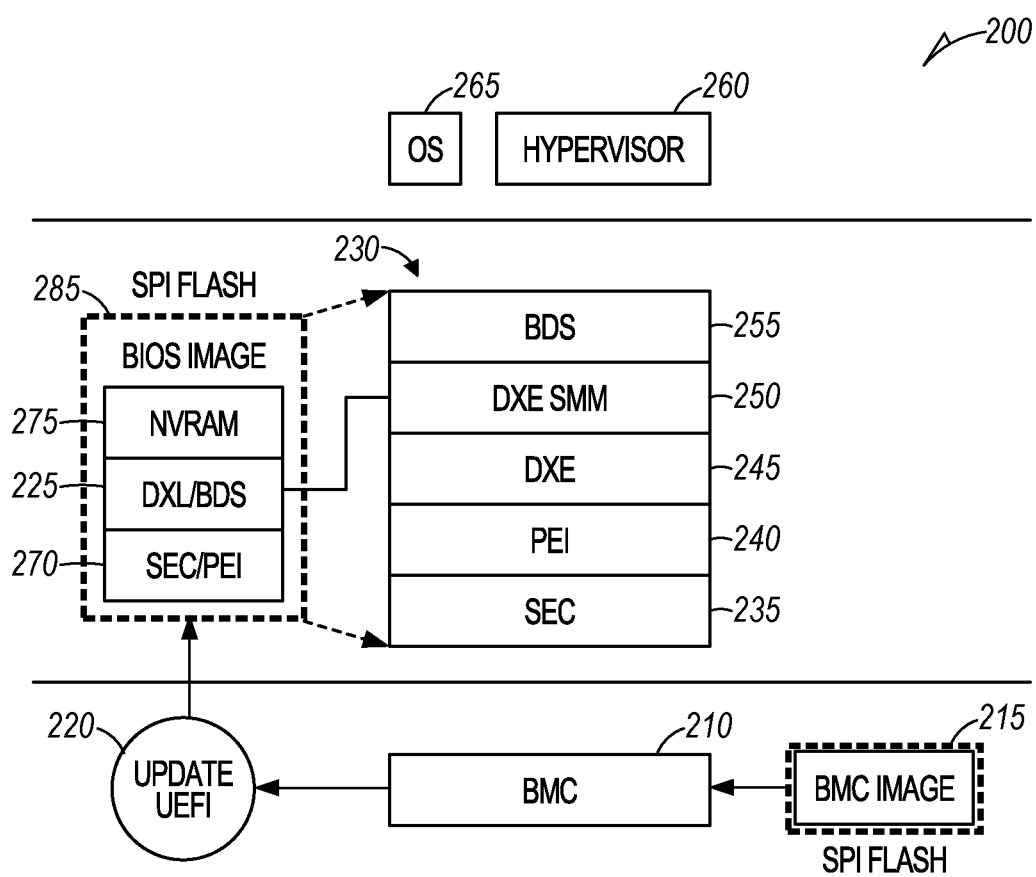
FIG. 2 is a block diagram that includes a firmware platform illustrating caching while updating firmware according to an example embodiment.

FIG. 2 is a block diagram that includes a firmware platform 200 illustrating caching while updating firmware. A BMC 210 is coupled to a BMC image stored on serial peripheral interconnect bus flash memory 215. BMC 210 may be used to update 220 firmware flash memory 215. Firmware is indicated in five levels generally at 230 in accordance with unified extensible firmware interface (UEFI) which is a set of specifications defining the architecture of firmware and interfaces to the firmware via SPI.

The firmware 230 in one example includes five layers or phases that are consistent with the UEFI specification and is also indicative of boot flow order. A security (SEC) 235 phase is the first phase of booting the firmware and is responsible for handling all platform 200 restart events, creating a temporary memory store, serving as the root of trust in the system, and passing handoff information to a next phase, a pre-extensible firmware interface (PEI) 240 phase. SEC 235 may contain modules with code written in assembly language.

PEI 240 is invoked quite early in the boot flow. Specifically, after some preliminary processing in the SEC 235 as any machine restart event will invoke the PEI phase. PEI 240 initializes central processing units, chipsets, and boards. PEI 240 initially operates with the platform 200 in a nascent state, leveraging only on-processor resources, such as the processor cache as a call stack, to dispatch Pre-EFI Initialization Modules (PEIMs). These PEIMs are responsible for initializing some permanent memory complement, describing the memory in Hand-Off Blocks (HOBs), describing the firmware volume locations in HOBs, and passing control into a Driver Execution Environment (DXE) 245 phase.

Prior to the DXE 245 phase, PEI 240 is responsible for initializing permanent memory in the platform 200 so that the DXE 245 can be loaded and executed. The state of the system at the end of the PEI 240 phase is passed to the DXE 245 through a list of position independent data structures called Hand-Off Blocks (HOBs).

There are several components that are set up in the DXE 245 phase, including DXE Foundation, DXE Dispatcher. and a set of DXE Drivers.

A DXE system management mode (SMM) 250 phase is used to access flash memory 225 to write various information related to sensed parameters that may be out of range, such as information from temperature sensors, error messages, security certificates, and other information to be stored in the flash memory 225. SSM 250 is a CPU mode of operation where a runtime portion of BIOS that includes code and data is shadowed/hosted in a top segment (TSEG) region in a memory map.

In one example, the cache contents may be copied from a flash memory region to the TSEG region in a cache operation. In a flush operation, the contents from the TSEG memory region may be saved to the NVRAM region in flash memory 225. DXE SMM 250 may not have access rights while BMC 210 is updating the firmware stored in the flash memory 225. Access attempts may be redirected to the cache 135 and RAM 140 during updating of the firmware.

Firmware 230 finally includes a boot device selection (BDS) 255 phase. BDS may is implemented as part of a BDS Architectural Protocol. A DXE Foundation will hand control to the BDS Architectural Protocol after all of the DXE drivers whose dependencies have been satisfied and have been loaded and executed by a DXE Dispatcher. BDS 255 is responsible for initializing console devices, loading device drivers, and attempting to load and execute boot selections.

The various phases of firmware may be stored in various areas of flash memory 225 as indicated at SEC/PEI 270, and DXE/BDS 275. A further area of flash memory 225 includes an NVRAM 280, and basic input/output (BIOS) images 285. SEC 235. PEI 246. DXE 245 and BDS 255 are code portions of the BIOS images 285. NVRAM 280 is a data portion of BIOS. BMC images may also be stored in BIO 285.

The firmware 230 may serve to interface higher level software, such as a hypervisor 260 to manage virtual machines, and one or more operating systems indicated at operating system (OS) 265. Once the platform 200 is initialized by firmware 230, the OS 265 is booted and other software may then be loaded.

Figure 3:
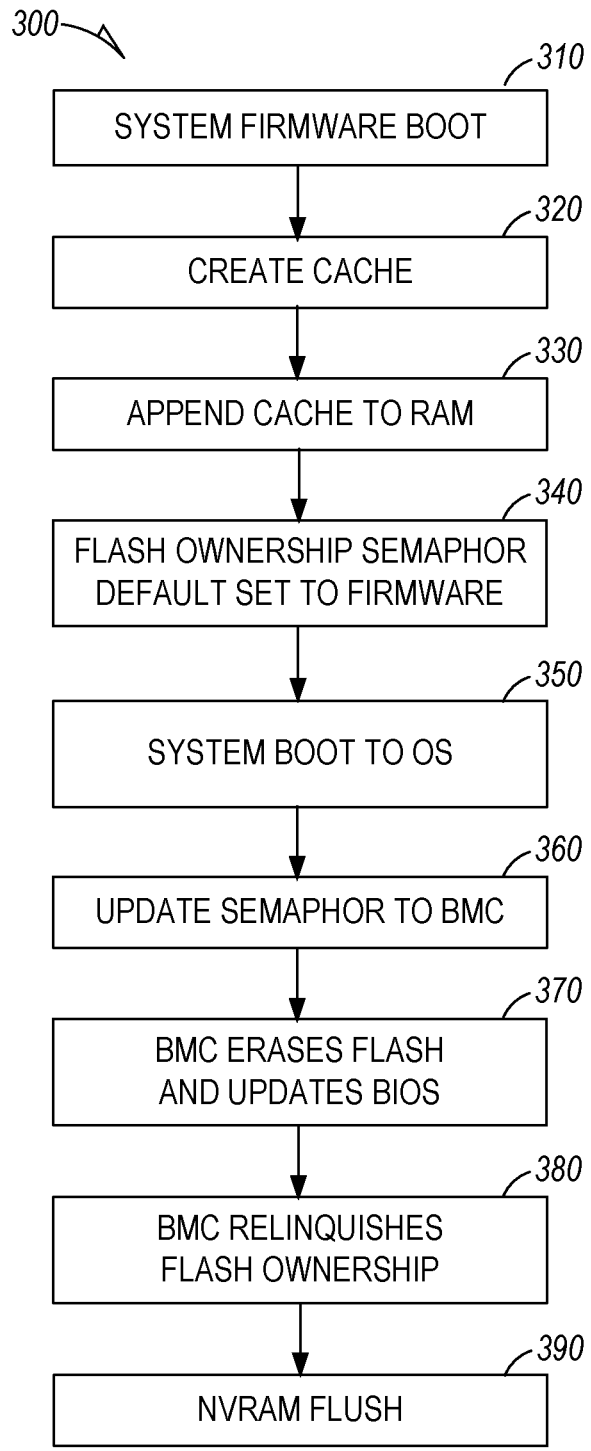
FIG. 3 is a flowchart illustrating a computer implemented method of updating firmware stored in flash memory according to an example embodiment.

FIG. 3 is a flowchart illustrating a computer implemented method 300 of updating firmware 230 stored in flash memory via BMC 210. In one example, the firmware 230 may be consistent with a specification referred to as unified extensible firmware interface service provider interface (UEFI). Method 300 begins at operation 310 with a system firmware boot, referred to as a UEFI boot in one example. A cache, such as NVRAM_Cache is created at operation 320. The cache is appended to another storage device, such as RAM 140, which may also be non volatile. At operation 340, a flash memory ownership semaphore default is set to firmware 230 to allow the firmware to access the flash memory.

Operations 320, 330, and 340 may be performed by DXE SMM 250, which has access flash memory 225 up to this point in method 300. The system is booted to an operating system at operation 350.

In response to receipt of a firmware update, further operations are performed by BMC 210. Operation 360 updates the semaphore to indicate that BMC has exclusive access to the flash memory. BMC 210 then erases the flash memory and updates the flash memory with a new version of BIOS at operation 370. At operation 380, BMC 210 relinquishes the flash ownership, setting the semaphore back to the firmware. The flash memory is then flushed by the DXE SMM 250 at operation 390.

Figure 4:
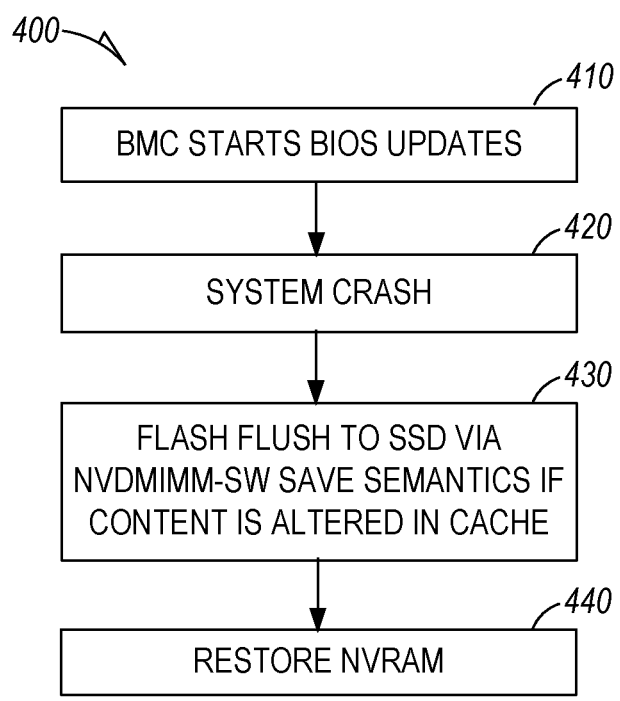
FIG. 4 is flowchart illustrating a method of restoring flash memory in the event of a system crash during updating firmware while using a cache according to an example embodiment.

FIG. 4 is flowchart illustrating a method 400 of restoring flash memory in the event of detecting a system crash during updating firmware while using a cache. Method 400 demonstrates resilience provided by such use of a cache during firmware updates. Method 400 beings following erasure of the flash memory at operation 370 in method 300. Operation 410 starts BIOS updates via BMC 210. At operation 420, the system may detect a system crash prior to completion of the update. Operation 320 flushes the flash memory to a solid state storage device (SSD) or other non-volatile memory or storage device via NVDIMM-SW (NVDIMM-Software). Semantics are saved if content was altered in the cache. At operation 440, the flash memory is restored.

Figure 5:
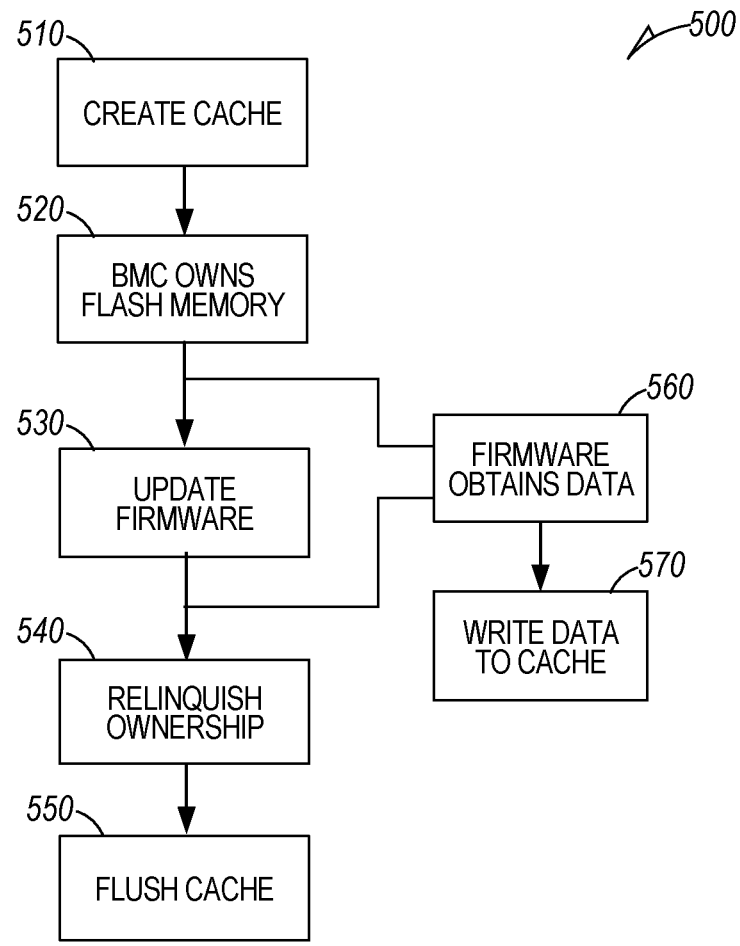
FIG. 5 is a computer implemented method of updating firmware according to an example embodiment.

FIG. 5 is a computer implemented method 500 of updating firmware. Method 500 begins at operation 510 by creating a cache within system management memory to cache data from a firmware flash memory to allow access by system firmware. The cache may be appended to RAM via an aperture in one example.

A baseboard management controller is then provided exclusive ownership of firmware flash memory at operation 520 such as by use of a semaphore. Such exclusive access may be provided in response to a firmware update becoming available. The update may be used to fix a hardware problem or harden the hardware against malicious attacks. Operation 530 updates the firmware in the firmware flash memory via the baseboard management controller. The baseboard management controller relinquishes ownership of firmware flash memory at operation 540.

In one example, at operation 550, the cache is flushed back to the firmware flash memory in response to baseboard management controller relinquishing ownership of the firmware flash memory.

While the baseboard management controller has exclusive access to the firmware flash memory, data representing a status of the system, such as errors that may occur in processing information, or data from sensors indicative of problems may be received by the firmware at operation 560. Such data may be written to the cache as indicated at operation 570 even though the baseboard management controller has exclusive access to the firmware flash memory. Flushing the cache back at operation 550 preserves such data to aid in addressing errors and other situations that require maintenance actions or further monitoring. Without the use of the cache, such data may be lost during firmware updates.

Figure 6:
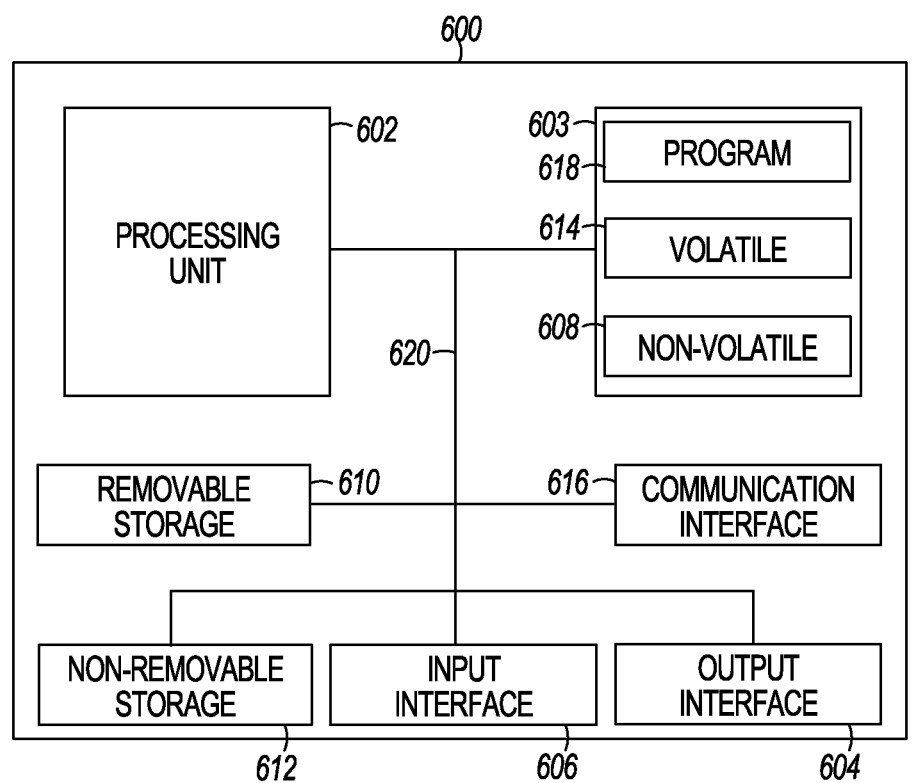
FIG. 6 is a block schematic diagram of a computer system to implement one or more example embodiments.

FIG. 6 is a block schematic diagram of a computer system 600 to perform firmware updates while providing a cache for storing information generated during such updates and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive. CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes creating a cache within system management memory to cache data from a firmware flash memory to allow access to the cache by system firmware, providing a baseboard management controller ownership of the firmware flash memory in a server, updating the firmware in the firmware flash memory via the baseboard management controller, relinquishing baseboard management controller ownership of firmware flash memory upon completion of updating the firmware, and flushing the cache back to the firmware flash memory in response to baseboard management controller relinquishing ownership of the firmware flash memory.

2. The method of example 1 wherein ownership includes exclusive ownership for accessing the firmware flash memory.

3. The method of example 2 wherein ownership is controlled via modification of a semaphore.

4. The method of example 3 wherein relinquishing ownership includes setting the semaphore to indicate the system firmware has access to the firmware flash memory.

5. The method of any of examples 1-4 and further including receiving data at the system firmware regarding a status of the system and writing the data to the cache via the system firmware while the baseboard management controller has ownership of the firmware flash memory.

6. The method of example 5 wherein the data represents processing errors.

7. The method of example 5 wherein the data represents a sensed parameter that is out of range.

8. The method of any of examples 1-7 wherein the cache includes non-volatile random access memory (NVRAM) that is appended to random access memory.

9. The method of any of examples 1-8 wherein the cache is created in response to receipt of a firmware update.

10. The method of example 9 wherein the update is configured to fix a hardware problem or harden the hardware against malicious attacks.

11. The method of any of examples 1-10 wherein the baseboard management controller erases the firmware flash memory prior to updating the firmware in the firmware flash memory.

12. The method of any of examples 1-11 and further including detecting a system crash after beginning to update the firmware, flushing the firmware flash memory to storage in response to content being altered in the cache, and restoring the firmware flash memory.

13. A machine-readable storage device has instructions for execution by a processor of a machine to cause the processor to perform operations to perform any of the methods of examples 1-12.

19. A device includes a processor and a memory device coupled to the processor and having a program stored thereon for execution by the processor to perform operations to perform any of the methods of examples 1-12.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
creating a cache within system management memory to cache data from a firmware flash memory to allow access to the cache by system firmware;
providing a baseboard management controller ownership of the firmware flash memory in a server;
updating the firmware in the firmware flash memory via the baseboard management controller;
relinquishing baseboard management controller ownership of firmware flash memory upon completion of updating the firmware; and
flushing the cache back to the firmware flash memory in response to baseboard management controller relinquishing ownership of the firmware flash memory.

2. The method of claim 1 wherein ownership comprises exclusive ownership for accessing the firmware flash memory.

3. The method of claim 2 wherein ownership is controlled via modification of a semaphore.

4. The method of claim 3 wherein relinquishing ownership comprises setting the semaphore to indicate the system firmware has access to the firmware flash memory.

5. The method of claim 1 and further comprising:
receiving data at the system firmware regarding a status of the system; and
writing the data to the cache via the system firmware while the baseboard management controller has ownership of the firmware flash memory.

6. The method of claim 5 wherein the data represents processing errors and operating system writes.

7. The method of claim 5 wherein the data represents a sensed parameter that is out of range.

8. The method of claim 1 wherein the cache comprises non-volatile random access memory (NVRAM) that is appended to random access memory.

9. The method of claim 1 wherein the cache is created in response to receipt of a firmware update.

10. The method of claim 9 wherein the update is configured to fix a hardware problem or harden the hardware against malicious attacks.

11. The method of claim 1 wherein the baseboard management controller erases the firmware flash memory prior to updating the firmware in the firmware flash memory.

12. The method of claim 1 and further comprising:
detecting a system crash after beginning to update the firmware;

flushing the firmware flash memory to storage in response to content being altered in the cache; and
restoring the firmware flash memory.

13. A machine-readable storage device having instructions for execution by a processor of a machine to cause the processor to perform operations to perform a method, the operations comprising:
creating a cache within system management memory to cache data from a firmware flash memory to allow access to the cache by system firmware;
providing a baseboard management controller ownership of the firmware flash memory in a server;
updating the firmware in the firmware flash memory via the baseboard management controller;
relinquishing baseboard management controller ownership of firmware flash memory upon completion of updating the firmware; and
flushing the cache back to the firmware flash memory in response to baseboard management controller relinquishing ownership of the firmware flash memory.

14. The device of claim 13 wherein ownership comprises exclusive ownership for accessing the firmware flash memory.

15. The device of claim 14 wherein ownership is controlled via modification of a semaphore and wherein relinquishing ownership comprises setting the semaphore to indicate the system firmware has access to the firmware flash memory.

16. The device of claim 13 wherein the operations further comprise:
receiving data at the system firmware regarding a status of the system; and
writing the data to the cache via the system firmware while the baseboard management controller has ownership of the firmware flash memory.

17. The device of claim 1 wherein the cache is created in response to receipt of a firmware update.

18. The device of claim 13 wherein the operations further comprise:
detecting a system crash after beginning to update the firmware;
flushing the firmware flash memory to storage in response to content being altered in the cache; and
restoring the firmware flash memory.

19. A device comprising:
a processor; and
a memory device coupled to the processor and having a program stored thereon for execution by the processor to perform operations comprising,
creating a cache within system management memory to cache data from a firmware flash memory to allow access to the cache by system firmware;
providing a baseboard management controller ownership of the firmware flash memory in a server;
updating the firmware in the firmware flash memory via the baseboard management controller;
relinquishing baseboard management controller ownership of firmware flash memory upon completion of updating the firmware; and
flushing the cache back to the firmware flash memory in response to baseboard management controller relinquishing ownership of the firmware flash memory.

20. The device of claim 18 wherein ownership comprises exclusive ownership for accessing the firmware flash memory and wherein the operations further comprise:
receiving data at the system firmware regarding a status of the system; and
writing the data to the cache via the system firmware while the baseboard management controller has ownership of the firmware flash memory;
detecting a system crash after beginning to update the firmware;
flushing the firmware flash memory to storage in response to content being altered in the cache; and
restoring the firmware flash memory.

* * * * *